Figure 1:
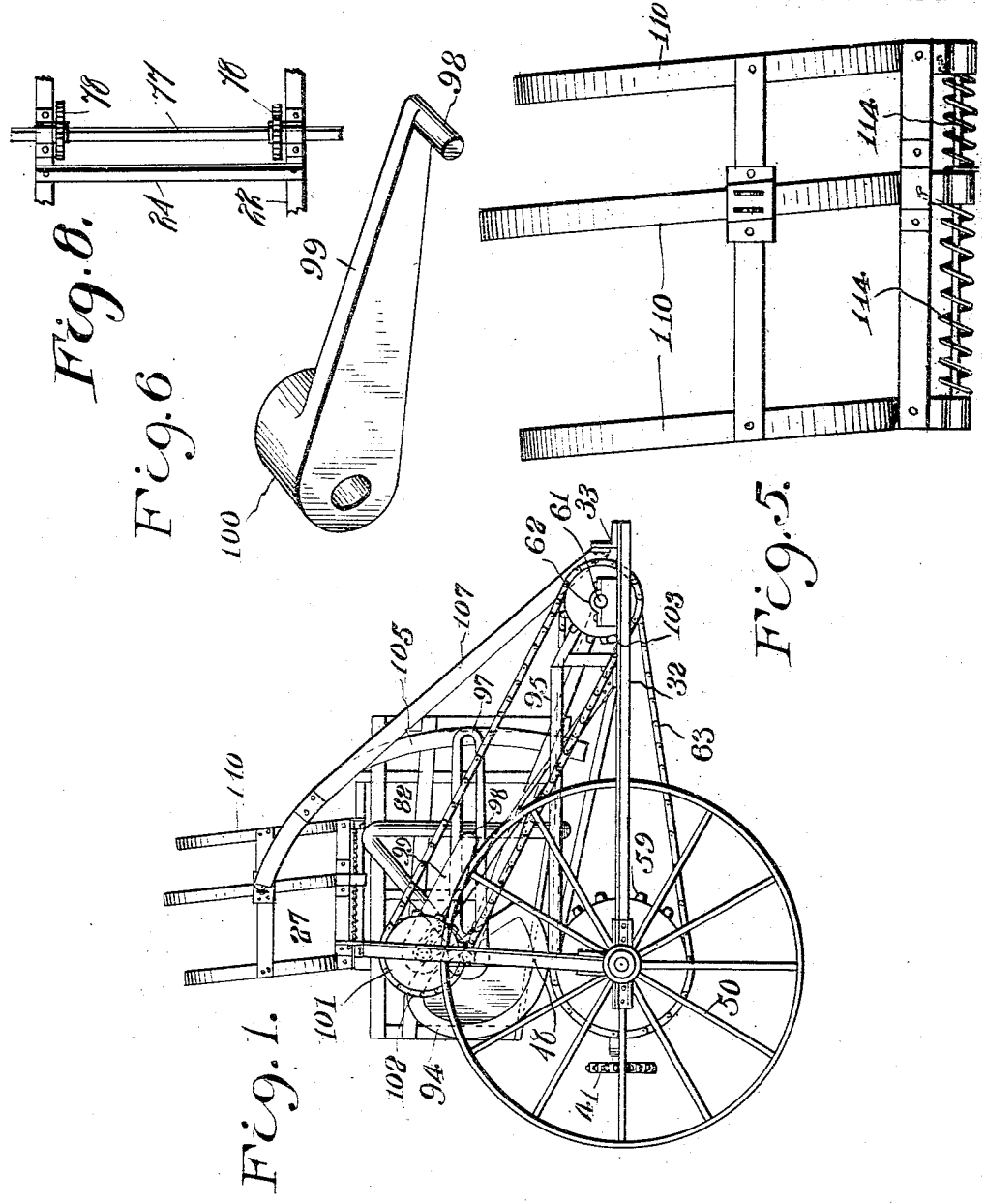

P. C. KUHL.
GRAIN SHOCKER.
APPLICATION FILED OCT. 25, 1911.

1,134,465.

Patented Apr. 6, 1915.
5 SHEETS—SHEET 3.

Witnesses:
Inventor
P. C. Kuhl,
By
Attorneys

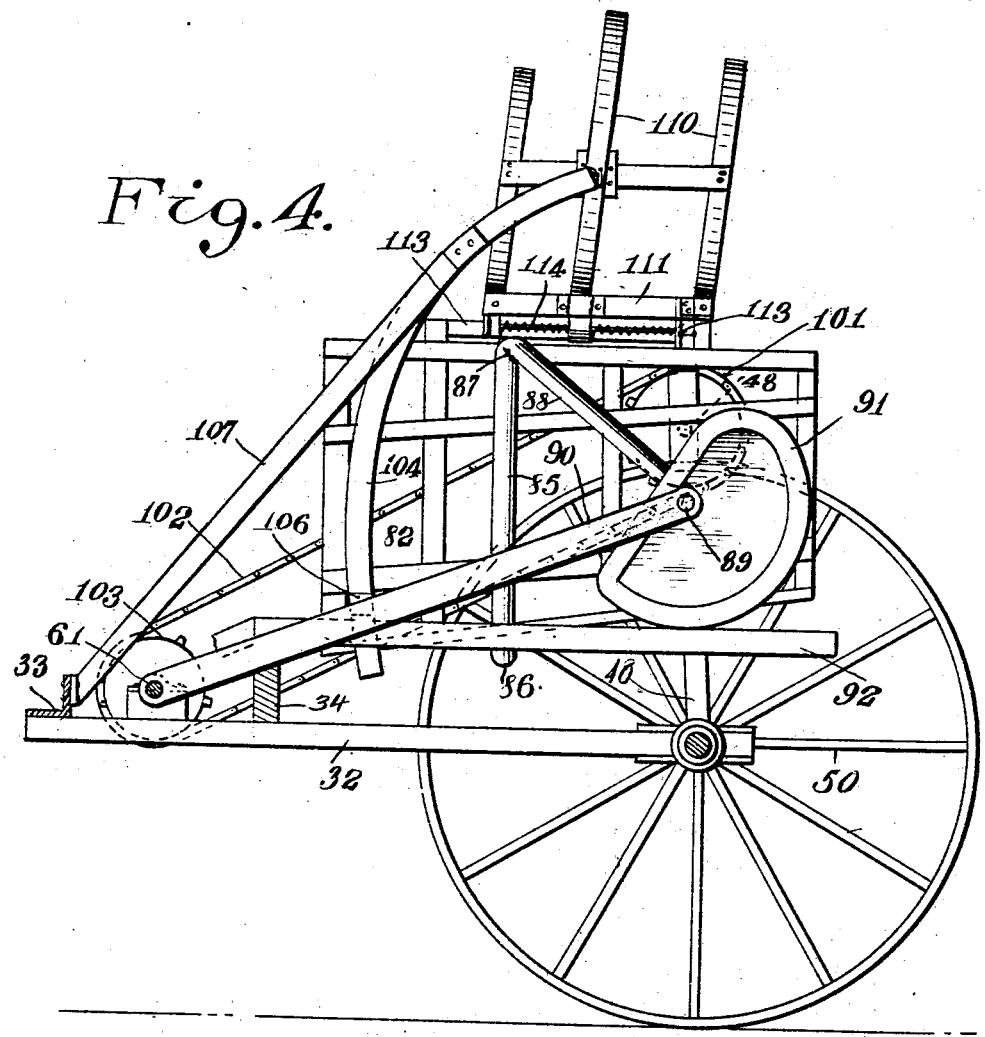
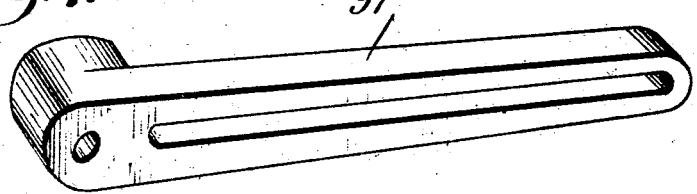

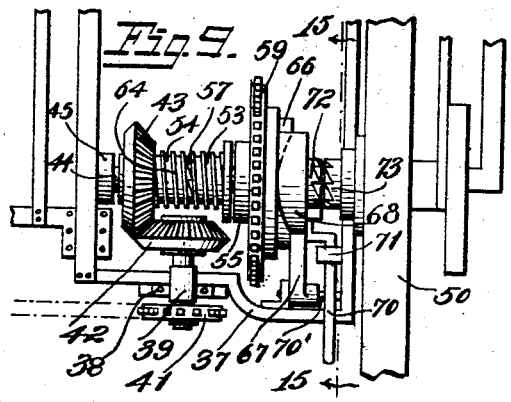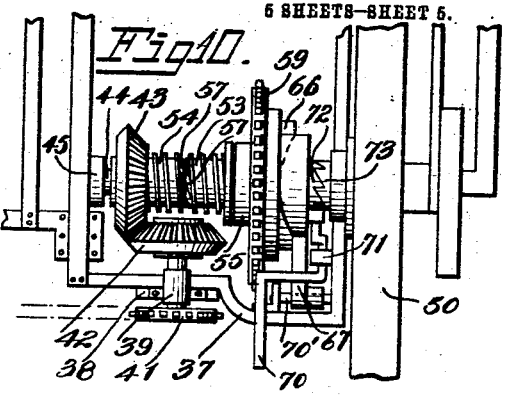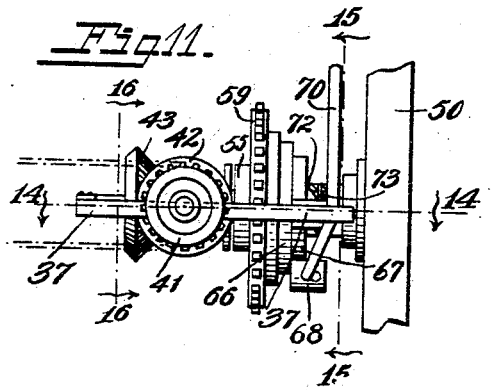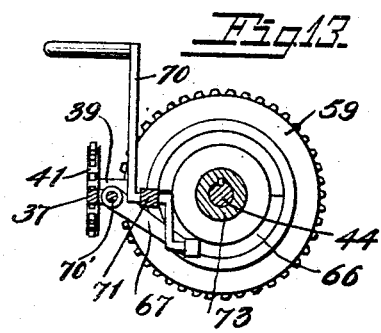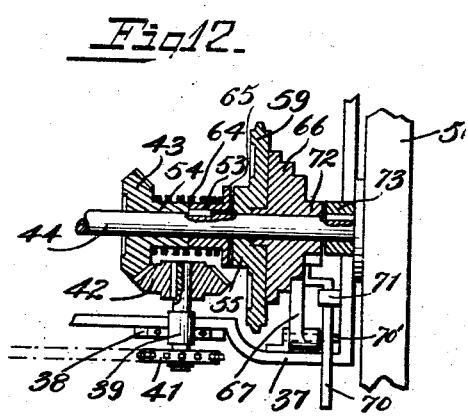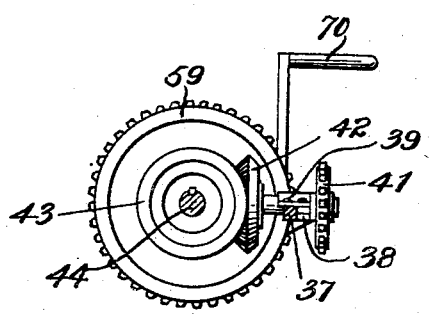

UNITED STATES PATENT OFFICE.

PHILIP C. KUHL, OF MEDICINE HAT, ALBERTA, CANADA, ASSIGNOR OF ONE-HALF TO FRANCIS M. GINTHER, OF MEDICINE HAT, CANADA.

GRAIN-SHOCKER.

1,134,465.  Specification of Letters Patent.  Patented Apr. 6, 1915.

Application filed October 25, 1911. Serial No. 656,668.

*To all whom it may concern:*

Be it known that I, PHILIP C. KUHL, a subject of the King of England, residing at Medicine Hat, in the Province of Alberta, Dominion of Canada, have invented certain new and useful Improvements in Grain-Shockers; and I do hereby declare the following to be a full, clear, and exact description of the invention, such as will enable others skilled in the art to which it appertains to make and use the same.

This invention relates to new and useful improvements in grain shockers and more particularly to an apparatus to be used in connection with binders and receive the bundles of grain discharged therefrom forming them into shocks and depositing the shocks at intervals along its path of movement.

The primary object of this invention is to construct a shocker such as described which can be very readily applied or detached from a binder of any usual type or design.

Another principal object of this invention is the provision of a shocker employing the use of a vertically movable and rotary cradle with means for retaining bundles of grain therein in shock formation and operating the same so as to deposit the shock in an upright position upon the ground.

Another object of this invention is the provision of a shocker comprising a cradle having a plurality of spring arms pivoted to its opposite sides and so constructed and engaged by a pair of cam plates that they will be moved to retain the bundles of grain deposited therein against displacement in shock formation and automatically release the same when the cradle is moved to its discharging position.

Still another object of this invention is to produce a shocker having a rotary cradle into which bundles of grain are deposited from a suitable conveyer, the said cradle being so mounted that it will have an intermittent rotary movement so as to quickly pass over the shock which has been deposited upon the ground in order that it will not strike against the same from the rear and knock it forwardly and then be slightly retarded in its movement to permit the apparatus to pass entirely from over the shock before it completes its revolution thereby preventing its striking the said shock from the opposite side and knocking it rearwardly.

A further object of this invention is to produce a shocker consisting of a wheeled frame in which is mounted a rotary cradle in such manner that the same will be raised and lowered through the medium of a pair of operating cams while being filled or discharging the shock.

A still further object of this invention is to improve and simplify devices of this character rendering them comparatively simple and inexpensive to manufacture, reliable and efficient in use and readily operated.

With the above and other objects in view this invention resides in the novel features of construction, formations, combinations, and arrangements of parts to be hereinafter more fully described, claimed and illustrated in the accompanying drawings, in which:—

Figure 2:
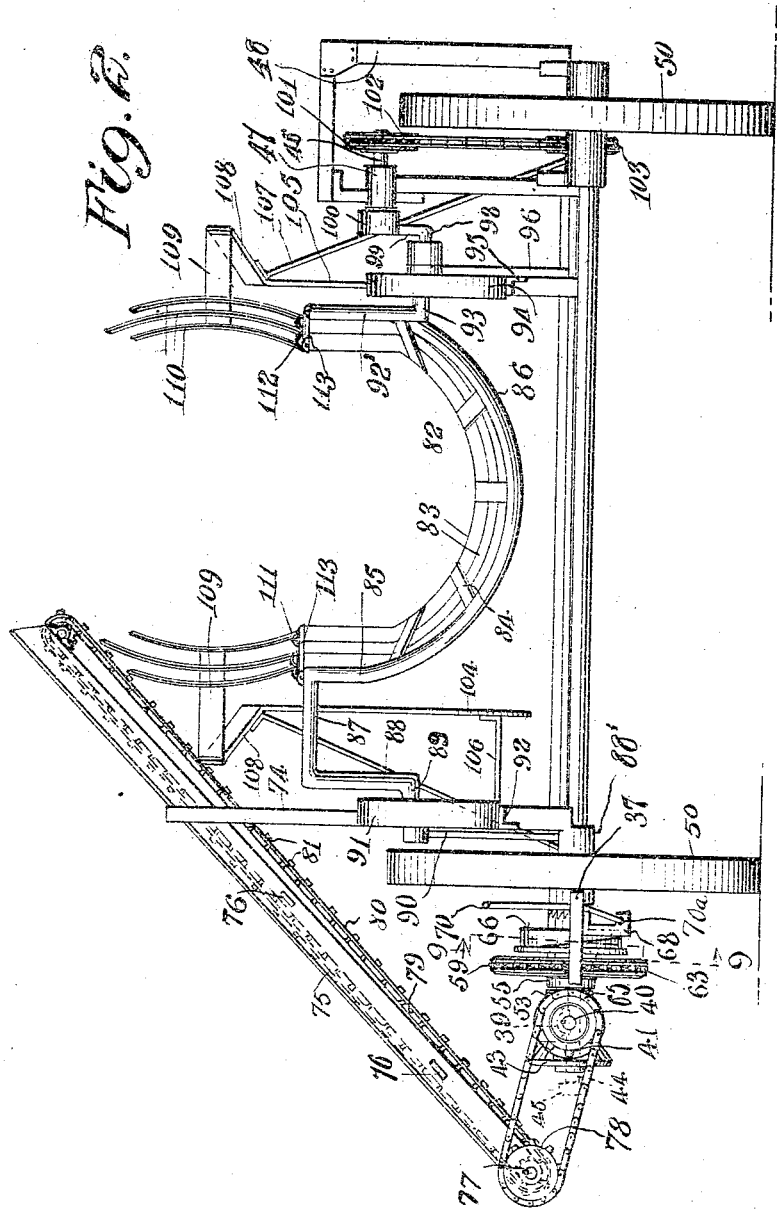
Figure 3:
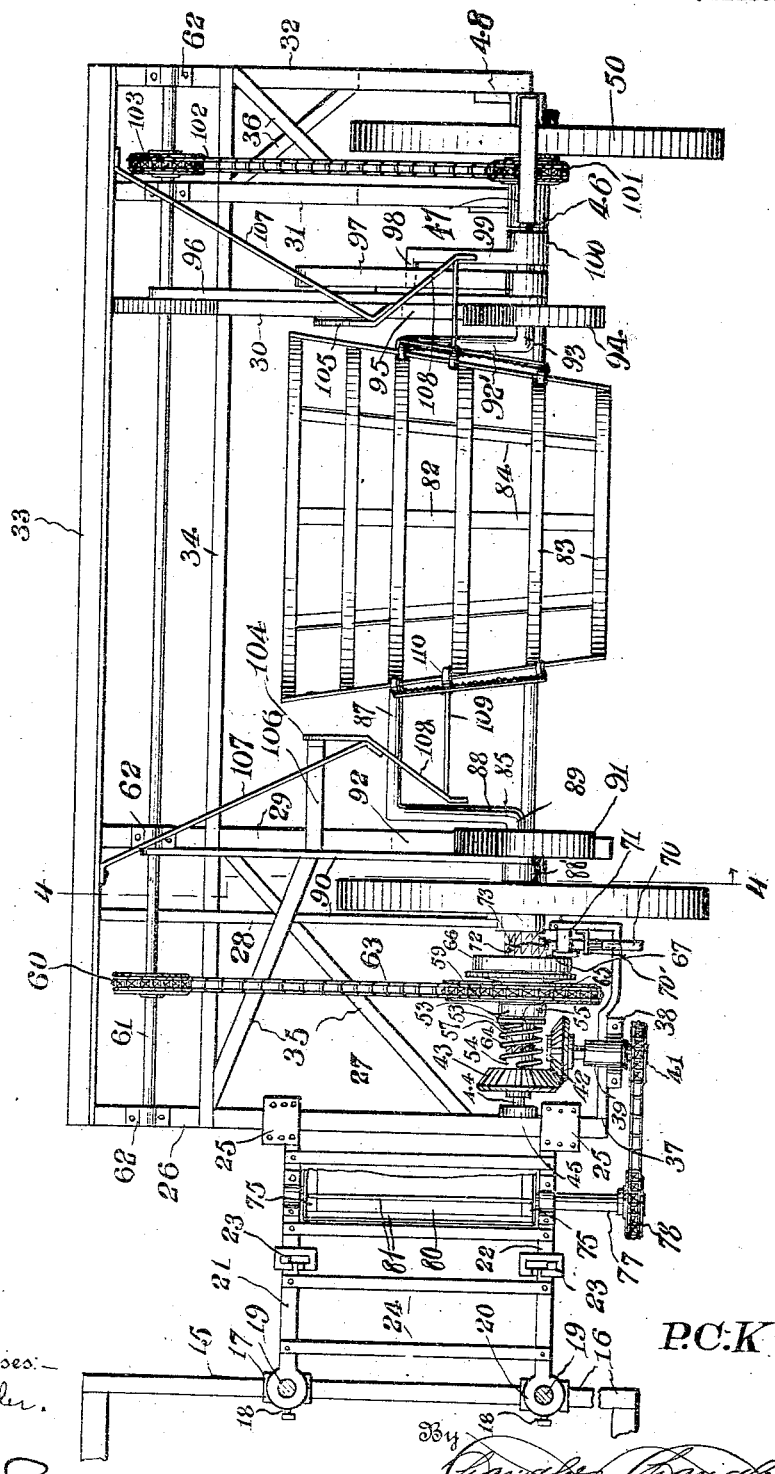

Figure 1 is a side elevation of my improved shocker. Fig. 2 is a rear view thereof. Fig. 3 is a top plan view. Fig. 4 is a section on the line 4—4 of Fig. 3. Fig. 5 is a detail of the cradle arm. Fig. 6 is a perspective of a certain operating lever. Fig. 7 is a perspective of another operating lever. Fig. 8 is a detail view showing a portion of the elevator. Fig. 9 is a detail plan view showing such clutch mechanisms used in connection with this device and a sprocket wheel connected thereto, the mechanism being shown in one position. Fig. 10 is a view similar to Fig. 11 but showing the mechanism in a second position. Fig. 11 is a detail rear view of this portion of the mechanism. Fig. 12 is a section on the line 14—14 of Fig. 3. Fig. 13 is a section on the line 15—15 of Fig. 3. Fig. 14 is a section on the line 16—16 of Fig. 3.

Referring to the drawings by similar characters of reference throughout the several views the numeral 15 designates generally a portion of a conventional binder to the side bar 16 of which is secured a pair of adjustable collars 17, each of which is held against any undesired displacement therefrom by a set screw 18 and also provided with vertically extending lugs 19 for slidable engagement through a pair of eyes 20 formed upon the side bars 21 of a supporting frame 22. This supporting frame 22 is coupled intermediate its ends as indicated by the numeral 23 and is connected at its opposite sides by a plurality of longitudinally extending bars or braces 24. The opposite ends of the bars 21 from those upon which the eyes 20 are formed are constructed to produce attaching members 25 which are secured in any suitable manner to the adjacent longitudinally extending side beam 26 of the improved shocker designated generally by the numeral 27. This shocker 27 comprises a frame which consists of the side bar 26 together with a plurality of longitudinally extending beams 28, 29, 30, 31 and 32 connected at their forward terminals by a transversely extending beam 33 and at points adjacent thereto by a parallel beam 34. The beams 26, 28, 29 and 34 are connected by crossed braces 35 which hold the same rigidly against any undesired displacement, while the beams 31, 32, and 34 are connected by similar braces 36. The rear ends of the bars 26 and 28 are connected by a short transverse rear beam 37, to the rear side of which is secured a bracket 38 which supports above the upper edge of the beam 37 a bearing 39 in which is journaled for rotary movement a shaft 40. This shaft 40 has keyed to its rear end a sprocket wheel 41 and to its opposite end a beveled pinion 42 which meshes with a similar pinion 43 keyed upon the stub axle 44 which is journaled in bearing 45 to the beam 26.

At 46 is a stub shaft which is mounted in a frame 48 having its inner end connected to a sleeve 47. The entire machine is supported on wheels 50.

Fixed to the pinion 43 is a sleeve 54 which is provided on its end with clutch teeth 57. Slidably mounted on the shaft 44 and keyed thereto for longitudinal movement is a sleeve 53 which is provided with clutch teeth adapted to engage the clutch teeth 57 and an integral flange 56 on the other end thereof against which spring 64 rests. These clutch teeth are constantly urged apart by the spring 64 surrounding said sleeve. Slidable on the shaft 44 and rotatable thereon is a sprocket 59 to which is secured a cam 66 having projecting from one end a sleeve 72 provided with clutch teeth which are adapted to engage clutch teeth on a sleeve 73 fixed upon the shaft 44, the wheel 50 carrying said sleeve 73. The sprocket wheel 59 is connected to a sprocket wheel 60 keyed to a counter-shaft 61 journaled in bearings 62 located upon the forward ends of the beams 26, 29, 31 and 32 and interposed between the bars 33 and 34, by a sprocket chain 63 so as to impart a rotary movement to the said counter-shaft upon rotation of the sprocket wheel 59. Suitably supported on the frame 37 is a rod 70' whereon slides a lever 67 having a head 68 which is provided with an opening 70ª to receive one end of a bent lever 70 which is journaled in a bearing 71 carried by said frame. By this means the member 67 is caused to move back and forth along the rod 70' so that the member 67 can be moved to be engaged by the cam 66 or can be moved away from said cam so that the cam does not engage said member.

When the cam 66 does engage the member 67 it will be observed from Figs. 9 to 14 that the sprocket wheel 59 is caused to move to the left of Fig. 9 by the action of said cam on the member 67 so that the clutch teeth on the sleeves 54 and 53 are engaged by such movement to the left. However, when the lower part of the cam is reached the spring 64 forces the sleeve 53 to the right of said Fig. 9 so that the clutch teeth on the members 72 and 73 engage. Thus the clutches are alternately engaged. By this means the elevating and tilting mechanisms are alternately driven as will be hereinafter understood. When, however, it is not desired to drive the elevating mechanism it is simply necessary to adjust the lever 70 so that 67 is moved to such position that the cam 66 no longer forces the sprocket 59 to the left as the latter rotates. Then the teeth on the members 53 and 54 will be constantly disengaged and in consequence the elevator will remain inoperative.

The side of the shocker frame adjacent the binder 15 has secured thereto by suitable straps 74 a pair of upwardly inclined side plates 75 which are held in spaced relation by cross bars 76. The ends of the plates 75 have journaled therein connecting shafts 77 to which are keyed adjacent the opposite ends thereof a pair of sprockets 78, each pair at the opposite ends of the frame being connected by sprocket chains 79 which are in turn connected by a conveyer band 80 which has secured to its outer sides slats 81 which engage the bundle of grain as it is deposited upon the said conveyer from the previously described binder. The bundles after being conveyed upwardly by means of the slats 81 are deposited into a cradle 82 which consists of a plurality of substantially semicircular ribs 83 of increasing diameters toward the forward end of the frame 27, which ribs 83 are connected by a plurality of rearwardly converging slats 84 thereby forming a cradle which is substantially semicylindrical in cross section being tapered toward its rear extremity and open at both ends. This cradle 82 is supported upon a crank shaft 85 which is bent intermediate its length in substantially U-shaped formation as clearly illustrated by the numeral 86 to conform to the cross sectional shape of the cradle, while the upper end at one terminal of the said U-shaped portion is bent horizontally as at 87 and then downwardly and rearwardly at an angle as indicated by the numeral 88 to a point in spaced relation above the bearing 88' at which point it is engaged by a bar 90 which holds it against any undesired longitudinal displacement.

The extension 89 of the shaft 85 has secured thereto a cam disk 91 which is adapted to rest upon a bearing plate 92 secured to the beam 29 for a purpose to be later disclosed. The opposite end of the shaft 85 is extended rearwardly from the end of the cradle to produce an extension 92' similar to the before mentioned extension 88 and at its end it is off set as indicated by the numeral 93 at which point it has keyed thereto a cam disk 94 similar to the before mentioned cam disk 91 which engages a bearing plate 95 located upon the upper side of the rear end of the longitudinal beam 30. The shaft 85 is held against any undesired longitudinal movement at its extension 93 by means of a bar 96 similar to the before mentioned slotted bar 90.

The terminal of the extension 93 has keyed thereto a forwardly extending arm 97 which engages the off set terminal 98 of an arm 99 similar in shape but considerably shorter in length which is formed upon a sleeve 100 keyed to the inner end of the stub shaft 48. This stub shaft 48 has further keyed thereon a sprocket 101 which is connected through the medium of a sprocket chain 102 to a sprocket wheel 103 keyed to the countershaft 61 between the bars 31 and 32 whereby a rotary movement will be imparted to the stub shaft 48. A pair of cam plates 104 and 105 are secured to the inner edges of the said bars 29 and 30, respectively, by brackets 106 and 107. These cam plates 104 and 105 are bent outwardly at their ends as indicated by the numeral 108 for engagement with arms 109 carried by a plurality of closing fingers 110 which extend outwardly from a pair of bars 111 and 112 rotatably mounted upon the connecting bars 113 which engage the ends of the ribs 83. These bars 111 and 112 are so connected to the bars 113 by a plurality of springs 114 that the said fingers are normally retained in their raised position so that the bundles of grain may be dropped over their upper edges and into the cradle 82. Obviously, however, as the said cradle starts upon its rotary movement the engagement between the arms 109 and the curved extensions 108 of the cam plates 104 and 105 forces the fingers 110 inwardly into engagement with the bundles of grain located in the said cradle which obviously prevents their displacement therefrom when the cradle is moved to its discharging position. Simultaneously with this movement of the cradle, however, the arms 109 move beyond the ends of the plates 104 and 105 which permits the fingers to be forced from engagement with the bundles by means of the springs 114, thus freeing the shock. As said cradle is tilted through the medium of the crank shaft 85 the same is also lowered by the engagement with the reduced portions of the cams 91 and 94 with the bearing plates 92 and 95 at which position the off set portion 98 of the arm 99 moves along the slot formed in the arm 97 to a point adjacent the extension 93 of the shaft 85 which causes the said shaft to be rapidly rotated throwing said cradle 82 rapidly above the deposited shock thereby preventing any engagement with the said shock which would push the same forwardly causing it to be overthrown. As the cradle moves rapidly upwardly the pin or off set 98 moves through the slot formed in the arm 97 away from the extension 93 of the shaft 85, thereby retarding the movement of the cradle 82 to such extent that the entire apparatus will pass from over the shock before the said cradle again assumes its horizontal position, prior to being refilled, which prevents the same from striking against the forward side of the shock and causing the same to be overthrown by such contact.

The operation of the device is as follows: The clutch member is thrown through the medium of the lever 70 in such position that the conveyer will be operated through the medium of the drive wheel 50 which transfers the bundles of grain from the binder into the cradle 82 in such position that the heads of the said bundles will be located at the reduced end thereof. The lever 70 is then moved so as to throw the conveyer out of engagement with the said drive wheel and to throw the countershaft 61 into engagement therewith. The rotation of the said countershaft obviously rotates the crank shaft 85 thereby tilting the cradle so that the heads of the bundles are arranged uppermost, which bundles are insured against displacement by the means of the fingers 110 which are forced inwardly by the engagement of the arms 109 with the cam plates 104 and 105. As the cradle rotates the same will be lowered through the medium of the previously described cams 91 and 94 until when the cradle is in a vertical position the same will be at its lowermost position. Simultaneously with the arrival of the cradle in its vertical and lowermost position the arms 109 will pass beyond the ends of the plates 104 which releases the fingers 110 and permits the shock to be deposited in an upright position upon the ground. The cradle will be then rapidly rotated as the pin 98 is at the inner end of the slot formed in the arm 97 until the said cradle passes free from engagement with the upper end of the shock. At this position the cradle is raised through the medium of the cams and has the pin 98 passed outwardly with respect to the said slot formed in the arm 97 and the rotary movement of the cradle will be retarded which gives the apparatus a sufficient time to clear the shock before the cradle is returned to its normal position ready for refilling.

From the foregoing disclosure taken in connection with the accompanying drawings, it will be manifest that a shocker of the nature described is provided for which will fulfill all the necessary requirements of such a device.

Having thus fully described this invention, what I claim as new and desire to protect by Letters Patent, is:

1. The combination in a shocker, of a wheeled frame, a cradle located in said frame, a shaft supporting said cradle, an axle rotatable with the wheels of said frame, a slotted arm connected to the shaft which supports the cradle, an arm extending from the axle, a pin supported by the arm and movable through the slot formed in the before mentioned arm whereby a rotary movement will be imparted to the cradle and means to intermittently move said axle supported arm carried by said axle.

2. A shocker such as described comprising a frame, a cradle mounted in the said frame, a crank shaft supporting the cradle, cam disks keyed to the crank shafts and resting upon the frame, a slotted arm extending from the crank shaft, a pair of axles journaled in the frame, wheels carried by the axles and supporting said frame, an arm extending from one of said axles, a pin carried by the arm and engaging the slotted arm.

3. The combination in a shocker, of a frame, a cradle rotatable therein, a crank shaft supporting said cradle, cam disks keyed to the ends of the crank shaft and engaging the frame, a slotted arm extending from the crank shaft, axles journaled in said frame, wheels carried by the axles, an arm extending from one of said axles, a pin carried by the arm and engaging the slotted arm, fingers mounted upon the cradle, and means for moving the fingers to and from the cradle upon the rotation thereof.

4. The combination in a shocker, of a frame, axles journaled in said frame, wheels keyed to the axles and supporting the frame, a cradle mounted in the frame, a crank shaft supporting the cradle and engaging the frame, cam disks secured to the crank shaft and engaging the frame, a conveyer supported by the frame and extending to the cradle, a clutch mechanism carried by one of the axles for throwing the elevator and the cradle into and out of operative connection with one of said axles, a pair of bars journaled upon the edges of the cradle, fingers supported by said bars, arms extending from the fingers, cam plates engaging said arms for moving the fingers inwardly to close one side of the cradle, a slotted arm extending from the crank shaft, an arm extending from one of said axles and provided with a pin engaging the slot formed in said slotted arm and means for connecting said shocker to a harvester.

In testimony whereof, I affix my signature, in presence of two witnesses.

PHILIP C. KUHL.

Witnesses:
J. J. MAHAFFY,
E. G. McDOUGALL.